United States Patent
Hillyard

(10) Patent No.: US 7,215,923 B2
(45) Date of Patent: May 8, 2007

(54) SYSTEM AND METHOD FOR ESTABLISHING A CONNECTION BETWEEN WIRELESS DEVICES

(75) Inventor: Jason Hillyard, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 735 days.

(21) Appl. No.: 09/924,306

(22) Filed: Aug. 6, 2001

(65) Prior Publication Data

US 2003/0027526 A1  Feb. 6, 2003

(51) Int. Cl.
*H04B 5/00* (2006.01)

(52) U.S. Cl. ............... 455/41.1; 455/41.2; 455/422.1; 455/434; 709/228; 340/5.62

(58) Field of Classification Search ...... 455/41.1–41.3, 455/434, 557, 552.1, 422.1; 709/200, 229, 709/228; 370/338; 358/1.15; 340/539.1, 340/5.62
See application file for complete search history.

(56) References Cited

U.S. PATENT DOCUMENTS

| | | | |
|---|---|---|---|
| 6,487,600 B1 * | 11/2002 | Lynch | 709/229 |
| 6,490,446 B1 * | 12/2002 | Haartsen | 455/422.1 |
| 6,493,104 B1 * | 12/2002 | Cromer et al. | 358/1.15 |
| 6,865,371 B2 * | 3/2005 | Salonidis et al. | 455/41.1 |
| 2001/0019956 A1 * | 9/2001 | Tada | 455/434 |
| 2001/0029166 A1 * | 10/2001 | Rune et al. | 455/41 |
| 2002/0059434 A1 * | 5/2002 | Karaoguz et al. | 709/228 |
| 2002/0065868 A1 * | 5/2002 | Lunsford et al. | 709/200 |
| 2002/0147027 A1 * | 10/2002 | Alford et al. | 455/557 |
| 2003/0036350 A1 * | 2/2003 | Jonsson et al. | 455/41 |
| 2003/0043771 A1 * | 3/2003 | Mizutani et al. | 370/338 |
| 2003/0096576 A1 * | 5/2003 | Salonidis et al. | 455/41 |

OTHER PUBLICATIONS

Specification of the Bluetooth System, Version 1.1, Feb. 22, 2001, pp. 1-1084.

* cited by examiner

*Primary Examiner*—Fan Tsang
*Assistant Examiner*—M S A Elahee
(74) *Attorney, Agent, or Firm*—McAndrews, Held & Malloy, Ltd.

(57) ABSTRACT

A system and method according to the present invention allow two or more peer-to-peer wireless devices to automatically connect to each other with no knowledge or pre-configuration of client/server roles. According to a first aspect of the present invention, a wireless device performs inquiries at a random interval, and performs an inquiry scan and a page scan when not performing the inquiries. Upon receiving a first device address in response to one of the inquiries, the wireless device performs a first page using the device address to establish a connection. And upon receiving an inquiry during the inquiry scan, the wireless device responds with a second device address, and if a second page is received during the page scan, establishes a connection.

21 Claims, 7 Drawing Sheets

SYSTEM AND METHOD FOR ESTABLISHING A CONNECTION BETWEEN WIRELESS DEVICES

BACKGROUND

1. Field of the Invention

The present invention relates generally to wireless communications, and more particularly to a system and method for establishing a connection between wireless devices.

2. Discussion of the Related Art

In today's electronically interconnected world, the normal complement of electronic equipment in the home or business includes devices that are connected to one another in different ways. For example, many desktop computer systems have a central processing unit (CPU) connected to a mouse, a keyboard, a printer and so on. A personal digital assistant (PDA) will normally connect to the computer with a cable and a docking cradle. A television may be connected to a VCR and a cable box, with a remote control for all three components. A cordless phone connects to its base unit with radio waves, and it may have a headset that connects to the phone with a wire. In a stereo system, the CD player, tape player and record player connect to the receiver, which connects to the speakers. These connections can be difficult to install and maintain, particularly for the lay user.

Alternatives to these conventional approaches to connectivity have been proposed. Bluetooth™ (BT) is a computing and telecommunications industry specification for connectivity that is both wireless and automatic, as described in *The Specification of the Bluetooth System*, Version 1.1, Feb. 22, 2001, ("the BT specification"), which is incorporated herein by reference. BT allows any sort of electronic equipment—from computers and cell phones to keyboards and headphones—to make its own connections, without wires, cables or any direct action from a user. Because BT connections are wireless, offices can be designed without regard to cable placement and users can travel with portable devices without having to worry about carrying a multitude of cables. These connections can be established automatically, where BT devices find one another and form a connection without any user input at all.

BT requires that a low-cost microchip transceiver be included in each device. The BT microchip transceiver communicates on a frequency of 2.45 GHz, which has been set aside by international agreement for the use of industrial, scientific and medical devices (ISM). In addition to data, up to three voice channels are available. Each BT device has a unique 48-bit device address from the Institute of Electrical and Electronics Engineers 802 standard. Connections can be point-to-point or multi-point. Data can be exchanged at a rate of 1 megabit per second (up to 2 Mbps in the second generation of the technology).

A number of common consumer devices also take advantage of the same RF band. Baby monitors, garage-door openers and some cordless phones all make use of frequencies in the ISM band. The BT design employs various techniques to reduce interference between these devices and BT transmissions. For example, BT avoids interfering with other systems by sending out relatively weak signals of 1 milliwatt. By comparison, some cell phones can transmit a signal of 3 watts. The low power limits the range of a BT device to about 10 meters, thereby reducing the probability of interference with other devices.

BT also employs a spread-spectrum frequency hopping scheme to further reduce interference and increase capacity. BT devices use 79 randomly chosen frequencies within a designated range, changing from one to another on a regular basis 1,600 times every second. The random frequency hopping pattern makes it unlikely that two BT transmitters will be on the same frequency at the same time, thus reducing the probably of BT devices interfering with one another. This technique also minimizes the risk that other non-BT devices such as portable phones or baby monitors will disrupt BT devices since any interference on a particular frequency will last only a fraction of a second.

When BT devices come within range of one another, an electronic conversation takes place to determine whether they have data to share or whether one needs to control the other. Once the conversation has occurred, the devices form a Personal-Area Network (PAN) or "piconet". A piconet may link devices located throughout a room, such as a home entertainment system, or devices much closer together such as a mobile phone on a belt-clip and a headset, or a computer, mouse, and printer. Once a piconet is established, the connected devices randomly hop frequencies in unison to communicate with one another and avoid other piconets that may be operating nearby.

According to the BT specification, inquiry and paging procedures are used to establish new connections. The inquiry procedure enables a device to discover which other devices are in range, and what their device addresses and clocks are. The device can then establish an actual connection by paging the desired device address. The device that carries out a page establishes a connection and will automatically be the master of the connection. In the paging and inquiry procedures, the device access code (DAC) and the inquiry access code (IAC) are used, respectively. A unit performing a page scan or inquiry scan correlates against these respective access codes with a matching correlator.

An inquiry procedure is used where the destination's device address is unknown to the discovering device. For example, a device might seek access to unfamiliar public facilities like printers or facsimile machines, or access points to a network. Alternatively, the inquiry procedure can be used to discover which other BT devices are within range. According to the inquiry procedure, the discovering device transmits an inquiry message whereas devices that allow themselves to be discovered perform an inquiry scan operation. The discovering device repeatedly transmits the IAC in different hop channels, and listens in between the transmit intervals until it receives a response from a device being discovered. The discovering device collects the BT device addresses and clocks of all devices that respond to the inquiry message.

The discovering device can then, if desired, make a connection to any of the responding units using the paging procedure. The discovering device pages the responding devices by repeatedly transmitting the responding unit's DAC in different hop channels, and listens in between the transmit intervals until it receives a response to the page. The responding devices listen during a page scan, and respond if they receive a page for their own DAC. As described in the BT specification, a connection is established once the response to a page is received wherein the discovering device acts as a master and the responding device acts as a slave. The roles of master and slave are defined at the link level.

At the application level, the device that performs the inquiry and paging procedures is referred to as the client, whereas the device that performs the inquiry scan and page scan is referred to as the server. In many applications, the BT transceiver can be configured under software control to operate in either role. The designation of client/server role can result from the pre-configuration of both devices, such as where a first device operating as a client (e.g., a PDA) moves within range of a second device that is designed to only act as a server (e.g., a network access point). Here, the first device is configured to perform inquiry and paging operations whereas the second device is configured to perform inquiry scan and page scan operations. In a typical operation, the user of the first device initiates a command via a user interface (UI) to search for and connect to the second device.

However, in some peer-to-peer applications it would be desirable to have wireless transceivers capable of establishing connections automatically without requiring that the devices be pre-configured to act in the role of client or server. Peer-to-peer is a communications model in which each device has the same capabilities and either device can initiate a communication session. In other words, each device can act as both client and server. For example, in a testing and development environment, a need exists for wireless transceivers that, when integrated within various electronic devices, establish a wireless connection between devices automatically without any pre-configuration as to client/server roles. Here, the peer devices should automatically determine their respective client/server roles and establish the connection without user intervention. Further, these devices should be of relatively low complexity and expense. To this end, the wireless transceiver should utilize relatively little random access memory (RAM) and a limited or non-existent UI.

What is needed therefore is an improved system and method for the automatic connection and role configuration of peer-to-peer wireless devices.

SUMMARY OF THE INVENTION

The present invention satisfies this need by providing a system and method for allowing two or more peer-to-peer wireless devices to automatically connect to each other with no knowledge or pre-configuration of client/server roles. According to a first aspect of the present invention, a wireless device performs inquiries at a random interval, and performs an inquiry scan and a page scan when not performing the inquiries. Upon receiving a first device address in response to one of the inquiries, the wireless device performs a first page using the device address to establish a connection. And upon receiving an inquiry during the inquiry scan, the wireless device responds with a second device address, and if a second page is received during the page scan, establishes the connection.

These and other aspects of the present invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention provides a system and method for allowing two or more peer-to-peer wireless devices to automatically connect to each other with no knowledge or pre-configuration of client/server roles. Generally speaking, according to the present invention wireless devices perform inquiries at a random interval, and in between the inquiries perform inquiry scans and page scans. When a first device receives an inquiry from a second device during an inquiry scan, the first device responds with a device address. The second device then pages the first device using the device address to establish a connection. In the resulting connection, the first device acts in the role of a server, and the second device acts in the role of a client.

Because the peer devices are all configured to perform inquiries as well as inquiry and page scans, a connection can be formed automatically without any pre-configuration as to client/server roles. These roles are in effect assigned randomly, depending upon which device happens to be the first to successfully establish a connection.

Figure 1:
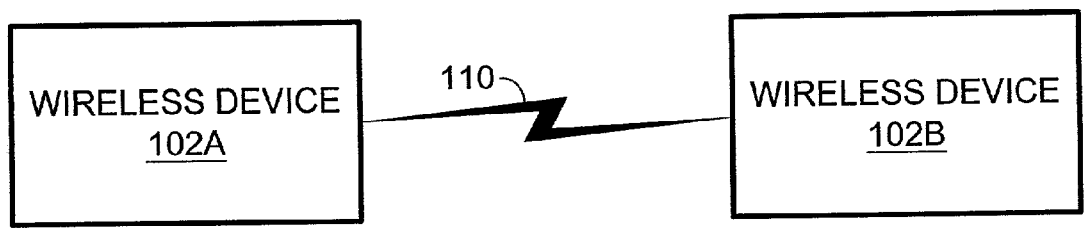
FIG. 1 depicts an example wireless communications environment within which various example embodiments of the present invention operate.

FIG. 1 depicts an example wireless communications environment 100 within which various example embodiments of the present invention operate. Two wireless devices 102 (shown as 102A and 102B) communicate with one another via a wireless link 110. Though various example embodiments of the present invention are described in the context of two wireless devices 102 in communication with one another, it will be apparent to those skilled in the art that the techniques described herein can be extended to establishing connections between more than two wireless devices 102.

Wireless devices 102 represent electronic devices that are equipped with a wireless radio capable of establishing and exchanging information over wireless link 110. For example, wireless device 102 can represent a wide range of consumer electronic devices such as a laptop computer, PDA, cordless telephone, stereo equipment, television or VCR. Wireless device 102 can also represent simple devices used for testing purposes. Wireless devices 102 include both portable devices and fixed devices, such as a network access point. Wireless link 110 represents the wireless connection established between two wireless devices 102. In the example BT embodiment, wireless link 110 represents a short-range RF link wherein the BT wireless devices communicate according to the protocol described in the BT specification.

Wireless devices 102 operate according to a peer-to-peer communications model, and as such are configured to operate in substantially the same manner. Wireless devices 102 need not, however, represent the same or even similar devices. In fact, wireless devices 102 can represent dissimilar devices such as a PDA and a VCR in communication with one another. These devices need only be configured to operate in substantially the same manner with regard to communications, though the hardware used to perform the operations can be dissimilar.

Figure 2:
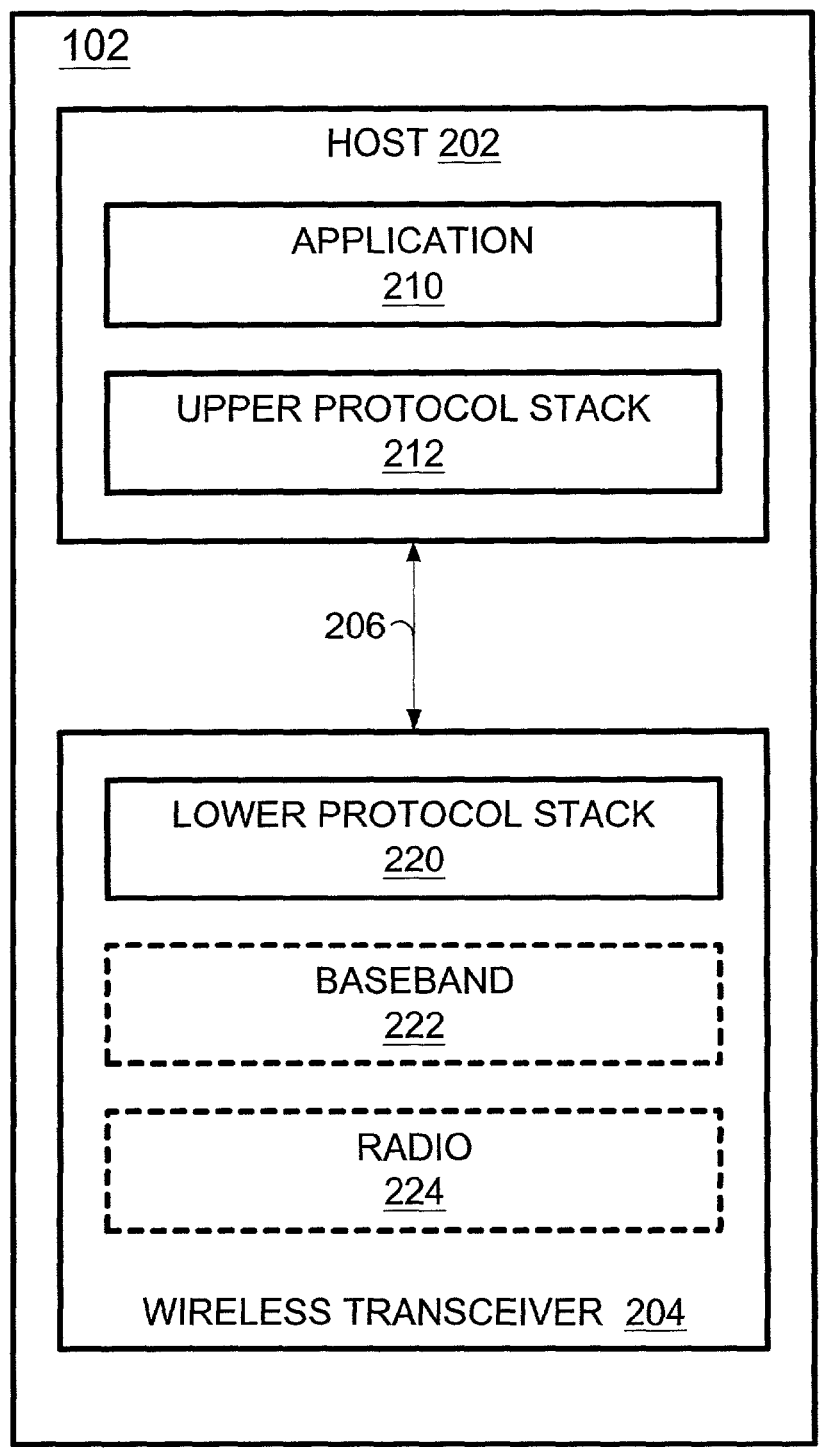
FIG. 2 illustrates the software components of a wireless device in greater detail according to an example embodiment of the present invention.

FIG. 2 illustrates the software components of wireless device 102 in greater detail according to an example embodiment of the present invention. As shown in FIG. 2, wireless device 102 includes a wireless transceiver 204 that provides wireless communication capability to a host system 202. Wireless transceiver 204 includes a lower protocol stack 220. As also shown in FIG. 2, lower protocol stack 220 can access various hardware components such as a baseband module 222 and a radio 224. Host system 202 includes an application 210 and an upper protocol stack 212.

Wireless transceiver 204 represents one or more devices that establish and communicate information (e.g., data, voice) via wireless link 110. For example, in the BT environment wireless transceiver 204 can represent a BT microchip transceiver, such as the Bluetooth™ Module (part number ROK 101 007) produced by Ericsson. In this example environment, lower protocol stack 220 may represent the lower layer protocols, such as the link manager protocol (LMP) and at least portions of the link controller (LC). Baseband module 222 carries out the baseband protocols, and radio 224 represents the 2.4 GHz BT radio as described in the BT specification.

Host system 202 represents the host device that controls the operation of wireless transceiver 204 to communicate via wireless link 110. Example host systems 202 can include both sophisticated computing devices such as a personal computer or PDA running a wide variety of software, and less sophisticated devices such as a simple microcontroller programmed to perform a more limited set of functions. In the BT environment, for example, upper protocol stack 212 may include the upper layer protocols such as the logical link control and adaptation protocol (L2CAP), the service discovery protocol (SDP), and the RF communication protocol (RFCOMM).

Application 210 represents the software that accesses upper protocol stack 212 to cause wireless transceiver 204, for example, to perform inquiry and paging procedures and to send and receives packets of data with another wireless device 102. According to an example embodiment of the present invention, the operations described below for automatically establishing wireless link 110 are performed under the control of application 210. As will be apparent, application 210 may or may not perform other operations as well depending upon the particular implementation.

According to an example embodiment of the present invention, application 210 does not include a UI for the user to interact with wireless transceiver 204 (though application 210 may provide a UI for host/user interactions not related to wireless communications). Under the control of application 210, wireless devices 102 establish wireless link 110 automatically without intervention by a user, obviating the need for any user interaction and thus the need for a UI. As will be apparent, the complexity and expense of wireless devices 102 is reduced by not having to provide a UI. However, according to other example embodiments of the present invention, wireless devices 102 may provide for some user interaction with wireless transceiver 204.

Host system 202 communicates with wireless transceiver 204 via a link 206 according to a pre-defined protocol. In the example BT environment, link 206 represents a universal asynchronous receiver transmitter (UART) serial link, where host system 202 and wireless transceiver 204 communicate using the host controller interface (HCI) protocol defined in the BT specification.

Figure 3:
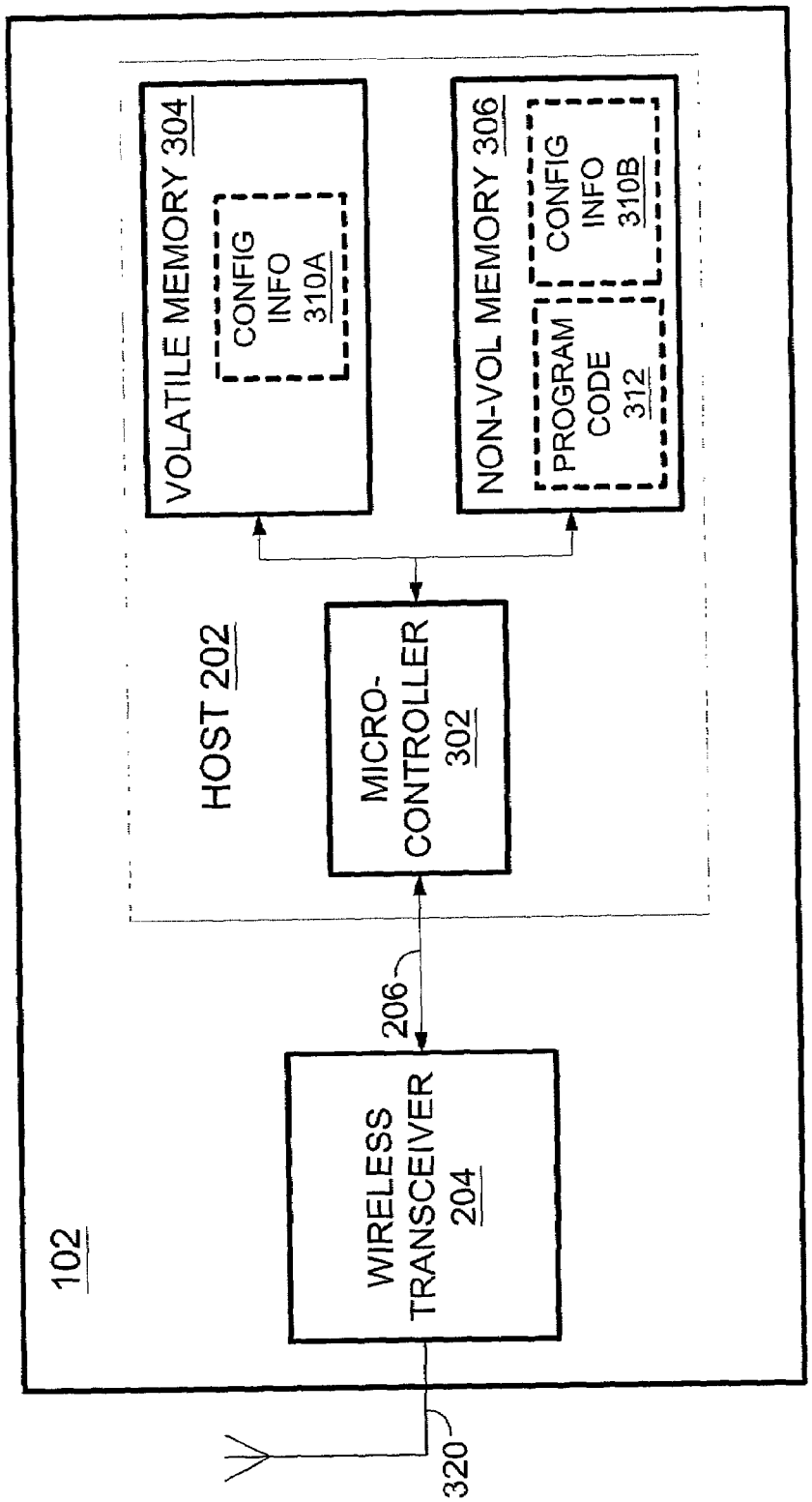
FIG. 3 depicts a wireless device in greater detail according to an example embodiment of the present invention, wherein the wireless device may include a microcontroller, volatile memory, and non-volatile memory.

FIG. 3 depicts wireless device 102 in greater detail according to an example embodiment of the present invention. In this example embodiment, host 202 includes a microcontroller 302 that may access information stored in volatile memory 304 and nonvolatile memory 306. As will be apparent, microcontroller 302 can represent many different special purpose computing devices known in the art. Volatile memory 304 can represent, for example, random access memory (RAM), whereas non-volatile memory 306 can represent read-only memory (ROM), flash RAM, or electrically erasable programmable read-only memory (EEPROM). Wireless transceiver 204 transmits and receives information over an antenna 320.

As shown in FIG. 3, microcontroller 302 operates under the control of program code 312 that is stored in non-volatile memory 306, such as ROM. Program code 312 can, for example, represent application 210 and upper protocol stack 212 depicted in FIG. 2. As will be described in greater detail below, certain example embodiments of wireless transceiver 204 also utilize configuration information 310 when establishing (or reestablishing) wireless link 110. Configuration information, if used by a particular embodiment, can be stored in volatile memory 304 (shown as configuration information 310A) and/or in non-volatile memory 306 (shown as configuration information 310B), depending upon the particular implementation. Configuration information 310 can include, for example, information that designates a role of client or server (role information). Wireless devices 102 can be pre-configured to act in the role of client or server, where the information is stored in non-volatile memory. However, according to various example embodiments of the present invention described below, connections between wireless devices can be established with no role pre-configuration. In these embodiments, configuration information 310B is not necessary which results in a savings in non-volatile memory 306.

Configuration information 310 can also include information related to connections with other wireless devices since the device was last powered-up. For example, role information can be saved for one or more past connections that indicates which role (i.e., client or server) the device storing the information acted in, as well as the address of the device connected to. This configuration information can be stored in volatile memory 304 (shown as configuration information 310A). Various example embodiments according to the present invention are described below that utilize this information to more quickly re-establish wireless link 110. As will be apparent, a relatively small amount of volatile memory 304 will be required to store configuration information 310A. The additional expense and complexity associated with this capability might be justified in certain applications, such as, for example, where faster re-connections are desirable. However, to the extent that configuration information 310A is not utilized, the need for volatile memory 304 is reduced, and in some cases, obviated altogether.

Figure 4:
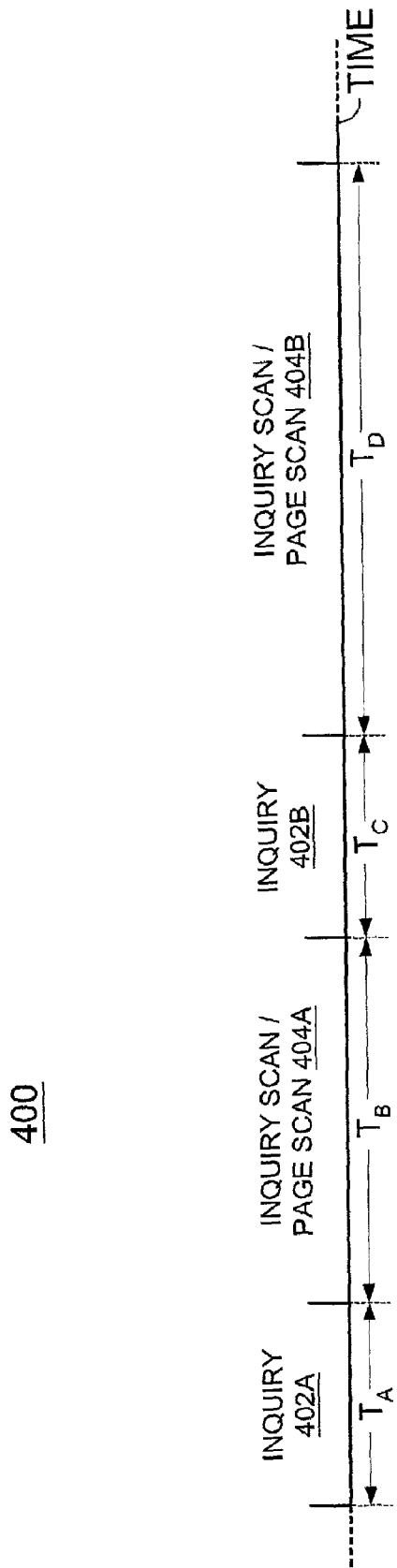
FIG. 4 depicts a timeline showing the procedures performed by each wireless device according to an example embodiment of the present invention.

FIG. 4 depicts a timeline 400 showing the procedures performed by each wireless device 102 according to an example embodiment of the present invention. These procedures will be described in conjunction with FIG. 5, which depicts a flowchart 500 that describes the operation of wireless devices 102 according to an example embodiment of the present invention. For purposes of illustration, the operations will be described from the perspective of wireless device 102A, though as described above, wireless devices 102 are peers and therefore all perform the operations depicted in FIGS. 4 and 5.

According to an example embodiment of the present invention, wireless devices 102 begin performing these operations automatically once the device powers up. This obviates the need for the user to affirmatively provide a command to begin operation, which is particularly important for those wireless devices 102 not having a UI for wireless operations. According to other example embodiments of the present invention wherein wireless devices 102 do provide such a UI, operations may be commenced either upon powering up or upon receiving an appropriate user command.

In operation 502, wireless device 102A performs inquiries at a random interval. As shown in FIG. 4, wireless device 102A performs a first inquiry 402A over the time interval shown as $T_A$, and a second inquiry 402B over the time interval shown as $T_B$. Each inquiry represents a message broadcast by the wireless device to discover which other devices are in range, such as wireless device 102B. In the example BT environment, as described above, the inquiry procedure is used to determine the address and clocks of devices within range of the discovering device.

According to an example embodiment of the present invention, inquiries 402 are performed at a random interval in order to reduce the likelihood that two devices will perform overlapping inquiries or inquiry scans (which prevents a connection from being established). As shown in FIG. 4, the randomly selected interval between inquiry 402A and 402B is shown as time $T_B$, and the randomly selected interval between inquiry 402B and the next inquiry (not shown) is shown as time $T_D$. As will be apparent, random intervals $T_B$ and $T_D$ can be chosen in various ways. For example, the intervals may be randomly selected according to a uniform distribution over pre-determined bounds.

Furthermore, inquiries 402 may be of fixed duration. As shown in FIG. 4, according to this example embodiment of the present invention, times $T_A$ and $T_C$ are equal in duration. However, the duration of inquiry 402 need not be fixed, and may vary according to other example embodiments of the present invention.

In operation 504, wireless device 102A performs an inquiry scan and page scan procedure for at least a portion of the random interval between inquiries performed in operation 502. As described above, during an inquiry scan procedure wireless device 102A listens for inquiries from discovering devices. Similarly, during a page scan procedure wireless device 102A listens for paging messages directed to the address of wireless device 102A. As shown in FIG. 4, an inquiry scan/page scan procedure 404A is performed between inquiry 402A and inquiry 402B during the time interval shown as $T_B$. Similarly, an inquiry scan/page scan procedure 404B is performed between inquiry 402B and the next inquiry (not shown) during the time interval shown as $T_D$.

In operation 506, upon receiving a response to an inquiry 402, wireless device 102A pages the responding device to establish wireless link 110. In the example BT environment, a wireless device responds to an inquiry with a device address that identifies the responding device. Upon receiving this device address, the inquiring wireless device pages the responding device using the address provided in the response, thereby establishing wireless link 110 according to the BT protocol. For example, wireless device 102B may receive inquiry 402A and respond with its device address. Wireless device 102A then pages wireless device 102B using the address. As a result of operation 506, wireless device 102A acts in the role of a client, and responding device 102B acts in the role of a server.

In operation 508, upon receiving an inquiry 402 during an inquiry scan/page scan procedure 404, wireless device 102A responds to the inquiry with its own device address. As described above, once the discovering device receives the responding device's address, the discovering device will page the responding device using the address. If the page is successful, wireless link 110 is established according to the defined protocol, such as the protocol described in the BT specification. For example, wireless device 102A may receive an inquiry 402 from wireless device 102B. Wireless device 102A responds by providing its device address to wireless device 102B. Wireless device 102B then pages wireless device 102A using the address, and if the page is received while wireless device 102A is performing an inquiry scan/page scan procedure 404, the page is successful and wireless link 110 is established. As a result of operation 508, wireless device 102A acts in the role of a server, and the paging device 102B acts in the role of a client.

Figure 5:
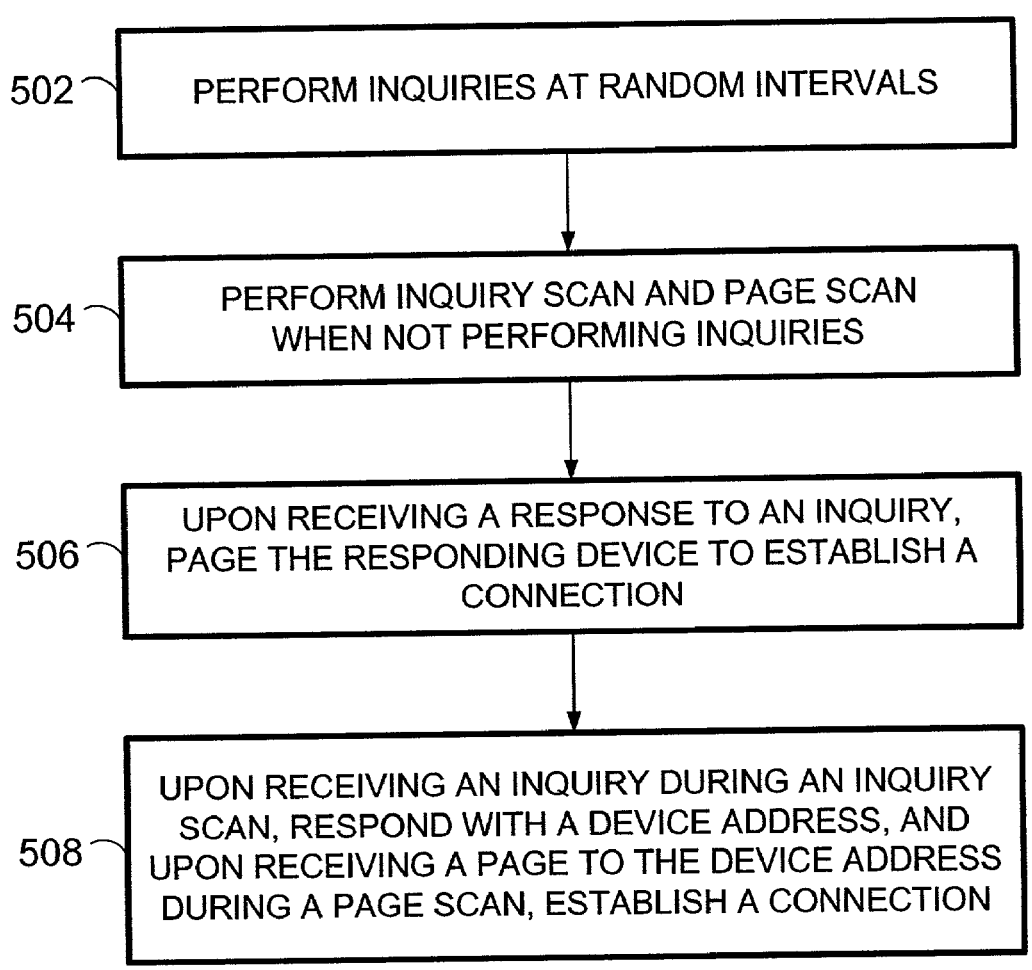
FIG. 5 depicts a flowchart that describes the operation of wireless devices according to an example embodiment of the present invention.

Wireless devices 102 configured to automatically establish connections according to the present invention all perform the operations described with respect to FIGS. 4 and 5, including inquiry 402 and inquiry scan/page scan procedures 404. Eventually, the randomization of the inquiry period will cause one device to perform an inquiry scan while the other device is performing an inquiry. Furthermore, there is no need for wireless devices 102 to be pre-configured to act as a client or server (as would be the case if the devices performed only inquiries 402 or inquiry scan/page scan procedures 404, but not both). Rather, each device can act as a client or server in any resulting wireless link 110, depending upon which device happens to respond first to an inquiry and be subsequently paged. Because no pre-configuration is necessary, and connections are established automatically, the necessity of having a UI for wireless operations is obviated. Furthermore, pre-configuration information 310B need not be stored in non-volatile memory 306.

Figure 6:
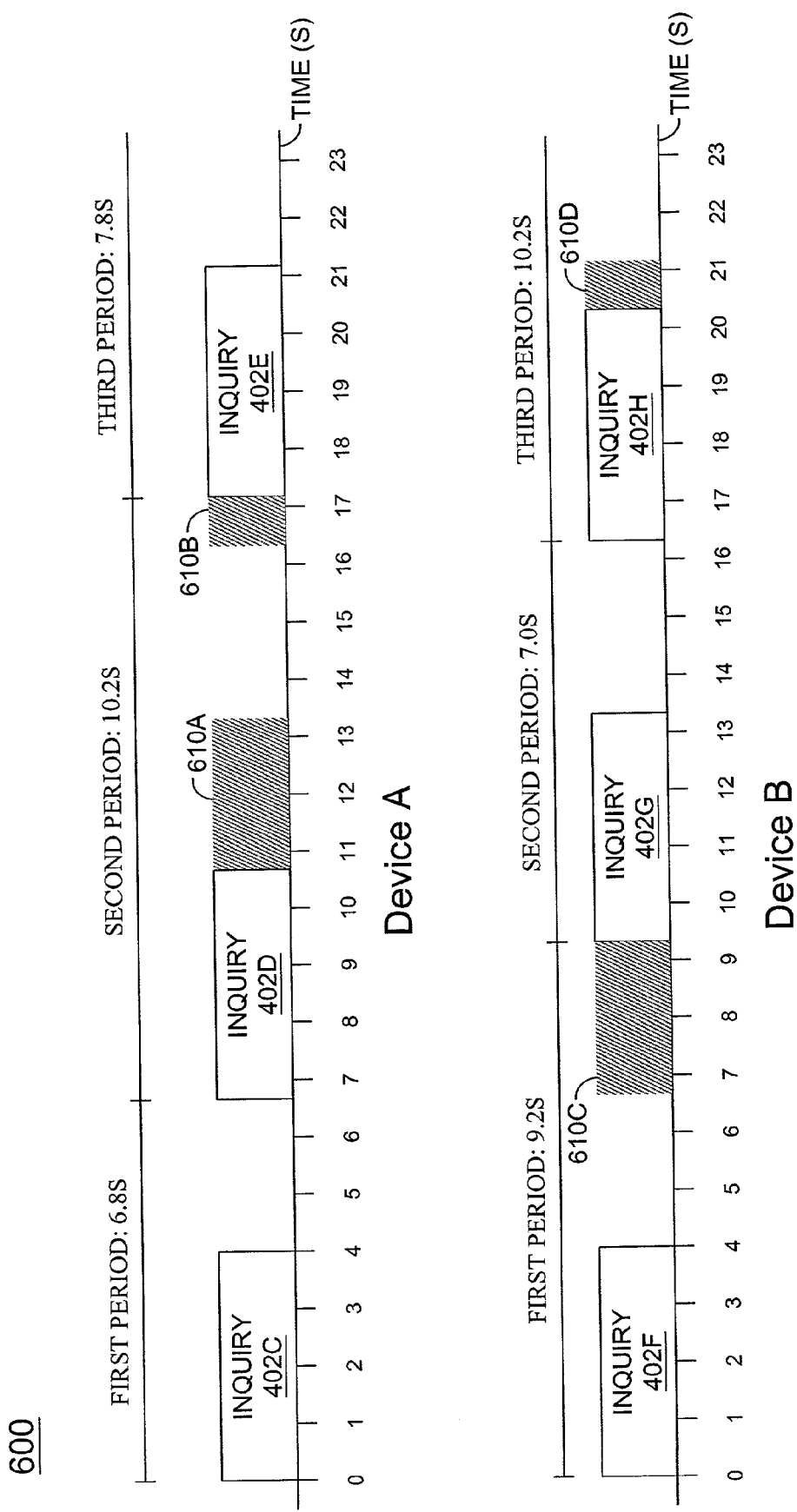
FIG. 6 depicts the operation of two example wireless devices according to an example embodiment of the present invention.

FIG. 6 depicts an example operation 600 wherein a first wireless device 102 (labeled Device A) and a second wireless device 102 (labeled Device B) are within range of one another and are attempting to establish a connection. According to an example embodiment of the present invention, a fixed-duration inquiry 402 is repeated with a random period until a connection is established. The duration of the period is randomly selected within pre-determined bounds. Inquiry scan/page scan procedures 404 (not shown) are performed during at least a portion of each period not occupied by inquiries 402. In the example BT environment, the duration of inquiry 402 is fixed at 3.84 seconds, and the random period is selected between 5.12 and 10.24 seconds according to a uniform distribution.

For example, consider the operation of Device A as shown in FIG. 6. Device A performs fixed-duration inquiry 402C during a first period having a duration of 6.8 seconds. Device A performs an inquiry scan/page scan procedure 404 (not shown in FIG. 6) during the remainder of the first period. During the second period having a duration of 10.2 seconds, Device A performs fixed-duration inquiry 402D. And during the third period having a duration of 7.8 seconds, Device A performs fixed-duration inquiry 402E. Device A also performs inquiry scan/page scan procedures 404 during the second and third periods when not performing inquiries 402. Similarly, Device B performs inquiries 402F, 402G, and 402H during periods having a randomly selected duration of 9.2 seconds, 7 seconds, and 10.2 seconds.

Assuming that Device A and Device B are within range of one another, Device B could receive inquiry 402D from Device A during Device B's first period when Device B is performing an inquiry scan/page scan procedure 404. The period of time during which Device B could receive inquiry 402D is indicated in FIG. 6 by the shaded region 610C. If Device B successfully receives inquiry 402D during interval 610C, Device B responds with its device address. Device A can then page Device B using Device B's address. The page could be received by Device B as early as Device B's second period, during the inquiry scan/page scan portion following inquiry 402G.

Device A might also receive inquiry 402G from Device B during the interval indicated by the shaded region 610A when Device A is performing an inquiry scan/page scan procedure. Device A might also receive inquiry 402H during the interval indicated by the shaded region 610B. If either of these inquiries 402 is successfully received, Device A responds with its device address. Similarly, Device B might receive inquiry 402E during the interval indicated by the shaded region 610D when Device B is performing an inquiry scan/page scan following inquiry 402H.

There may be situations where both wireless devices 102 successfully receive inquiries 402, and both page the other device to establish a connection. For example, Device B can successfully receive inquiry 402D during interval 610C, followed by Device A successfully receiving inquiry 402G during interval 610A. Both devices would then attempt to page the other device to establish a connection in the role of a client. According to the BT specification, a connection cannot be established by two clients; one device must act in the role of client (i.e., the paging device), and the other must act in the role of server (i.e., the paged device). According to an example embodiment of the present invention, these collisions are resolved by a higher software layer (not shown). Any such connection will be disconnected, and the devices will resume their inquiry and inquiry scan/page scan procedures.

Further, according to an example embodiment of the present invention, both wireless devices 102 connected in a wireless link 110 store configuration information 310A in volatile memory 304 once the link has been established. As described above, configuration information 310A can include, for example, the role in which the device acted and the address of the other device. If the connection is lost for whatever reason, the wireless devices can utilize configuration information 310A to help re-establish wireless link 110. For example, the devices can seek to continue in their previous roles when re-establishing wireless link 110. The device that previously acted in the role of a client pages the device that acted in the role of a server using the stored device address, whereas the server device performs page scan procedures in anticipation of the page. According to an example embodiment of the present invention, the number of times the client will attempt to re-establish a connection is limited. Once the number of attempts to re-establish a connection have been exhausted without success, both devices can return the normal operation described above. For example, the client may be allowed to attempt to re-establish the connection three times before both devices return to performing both inquiry 402 and inquiry scan/page scan procedures 404.

Figure 7:
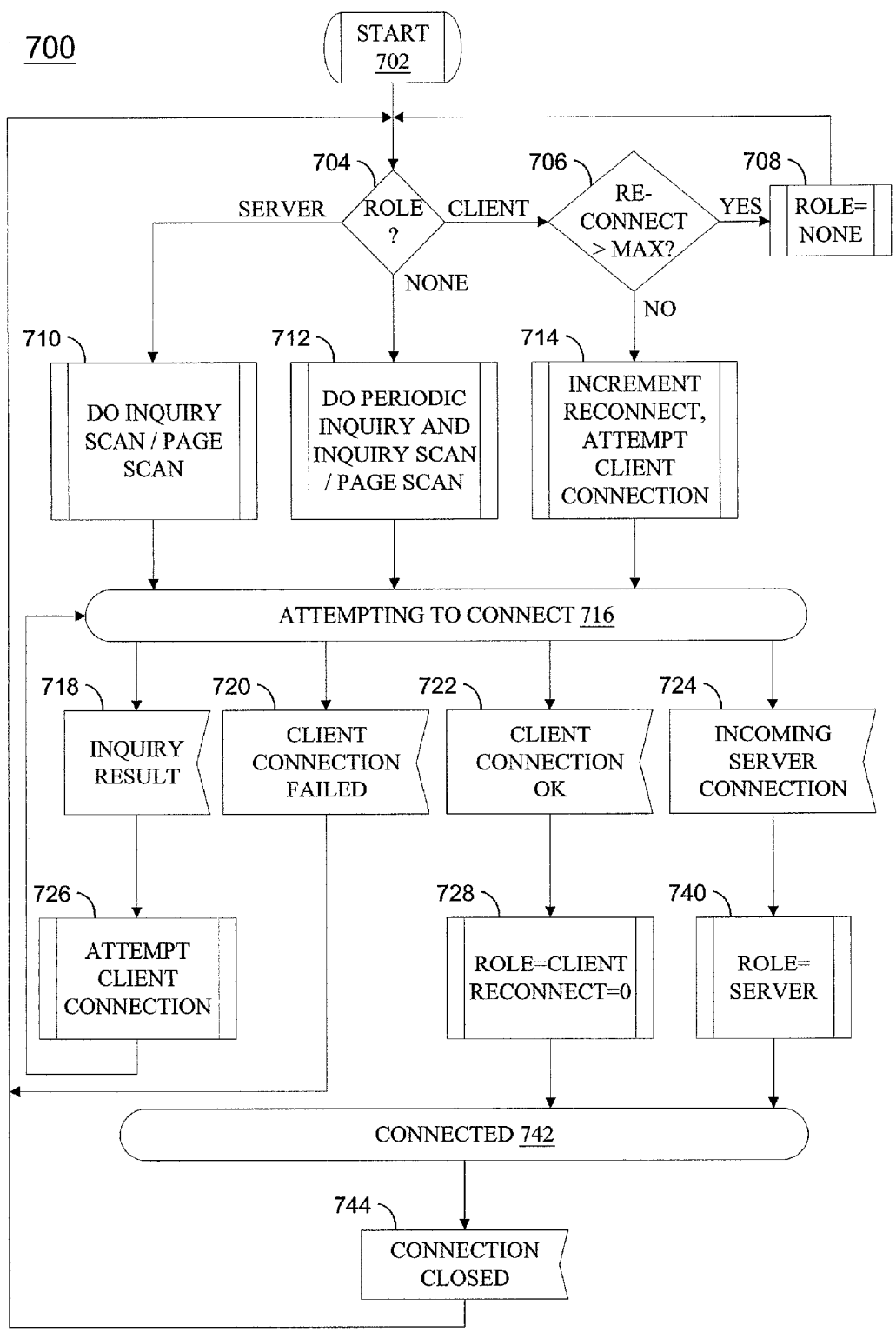
FIG. 7 depicts a flowchart that describes the operation of wireless devices in greater detail according to various example embodiments of the present invention.

FIG. 7 depicts a flowchart 700 that summarizes the operation of wireless devices 102 according to the various example embodiments of the present invention described above. In operation 704, wireless device 102 determines whether a role from a previous connection has been saved (if wireless device 102 is configured to store and utilize this information). If wireless device 102 previously acted in the role of a server, as indicated by configuration information 310, in operation 710 wireless device 102 performs an inquiry scan/page scan 404 procedure in anticipation of receiving a page from the client device. If wireless device 102 previously acted in the role of a client, in operation 706 wireless device 102 determines whether the number of attempts to re-establish a connection have exceeded a pre-established maximum. If the number exceeds the maximum, then in operation 708 the role is wireless device 102 is reset to NONE. If the number does not exceed the maximum, then in operation 714 the number of attempts is incremented and the wireless device attempts to re-establish the connection by paging the server device.

Returning to operation 704, if wireless device 102 does not have a stored role (shown as "NONE" in FIG. 700), then in operation 712 wireless device 102 performs periodic inquiries 402 at random intervals and inquiry scan/page scan procedures 404 (as described above). Attempting to connect state 716 represents the state each device returns to until a connection is established.

If wireless device 102 receives a response to an inquiry 402, as shown by state 718, then in operation 726 wireless device 102 attempts to establish wireless link 110 by paging the responding device. If wireless device 102 successfully pages another device, as shown by state 722, wireless link 110 is established and in operation 728 wireless device 102 stores its role as client and resets the number of reconnect attempts to zero. Wireless device 102 remains in connected state 742 until the connection is closed, as depicted by state 744, whereupon wireless device re-checks its role in operation 704.

If wireless device 102 is unsuccessful in paging another device, as shown by state 720, then operation returns to re-checking the role of wireless device 102 in operation 704. If wireless device 102 is successfully paged by another device, as shown by state 724, then in operation 740 wireless devices stores its role as a server and enters connected state 740 until the connection is closed in state 744.

As described above, wireless devices 102 configured according to the present invention are particularly well suited to testing and development environments. For example, in the BT environment, an embedded development board can be configured according to the present invention (such as the example embodiment described with respect to FIG. 3) to automatically establish a connection with a peer device. The board can be relatively simple and inexpensive, and requires no pre-configuration or other intervention by the user. The board can include a UI, if desired, but is not necessary for operation. If a UI is included, it can include, for example, a rudimentary input interface (e.g., a jumper on the board) and/or a rudimentary output interface (e.g., a light or simple display to indicate a successful connection).

Further, because all wireless devices 102 are configured in the same manner, it is possible to maintain a single set of software that is used in each device rather than having to maintain separate versions of the software for client devices and server devices. As will be apparent, having a single software set reduces development time and maintenance costs.

The present invention can include one or more computer programs which cause wireless devices 102 to perform the functions described herein and illustrated in the appended flowcharts. However, it should be apparent that there could be many different ways of implementing the invention in computer programming, or a combination of hardware and software, and the invention should not be construed as limited to any one set of computer program instructions. Further, a skilled programmer would be able to write such a computer program to implement the disclosed invention without difficulty based on the flowcharts and associated written description included herein. Therefore, disclosure of a particular set of program code instructions is not considered necessary for an adequate understanding of how to make and use the invention.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method for establishing a connection between wireless devices, comprising:
    (a) performing an inquiry;
    (b) performing an inquiry scan for a random duration following said inquiry;
    (c) establishing the connection after receiving a device address in response to said inquiry; and
    (d) performing a page scan while performing said inquiry scan.

2. The method of claim 1, wherein said inquiry has a fixed duration.

3. The method of claim 1, wherein said operation (c) comprises paging said device address.

4. The method of claim 1, wherein said method further comprises establishing the connection after receiving an inquiring device inquiry during said inquiry scan.

5. The method of claim 1, wherein said operation (d) comprises responding with a second device address upon receiving said inquiring device inquiry, and if said second device address is paged during said page scan, establishing the connection.

6. A method for establishing a connection between wireless devices, comprising:
    (a) performing inquiries at random intervals;
    (b) performing an inquiry scan and a page scan when not performing said inquiries and performing said page scan while performing said inquiry scan;
    (c) upon receiving a first device address in response to one of said inquiries, paging said first device address to establish the connection; and
    (d) upon receiving an inquiring device inquiry during said inquiry scan, responding with a second device address, and if said second device address is paged during said page scan, establishing the connection.

7. The method of claim 6, wherein said inquiries have a fixed duration.

8. The method of claim 6, wherein the wireless devices are not assigned client roles or server roles prior to establishing the connection.

9. The method of claim 6, further comprising storing configuration information upon the connection being established, and re-establishing the connection using said configuration information upon the connection being lost.

10. The method of claim 9, wherein said re-establishing is attempted a number of attempts until the connection is re-established, and if the connection is not re-established, returning to operation (a).

11. The method of claim 9, wherein said configuration information comprises role and device address information.

12. A method for establishing a connection between a first wireless device and a second wireless device, comprising;
    (a) at the first wireless device, performing first inquiries at random intervals and performing first inquiry scans when not performing said first inquiries, performing first page scans while performing said first inquiry scans;
    (b) at the second wireless device, performing second inquiries at random intervals and performing second inquiry scans when not performing said second inquiries, performing second page scans while performing said second inquiry scans; and
    (c) establishing the connection after the first wireless device receiving one of said second inquiries during one of said first inquiry scans.

13. The method of claim 12, wherein said first inquiries have a first fixed duration, and said second inquiries have a second fixed duration.

14. The method of claim 12, wherein the first wireless device and the second wireless device are not assigned client roles or server roles prior to establishing the connection.

15. The method of claim 12, wherein said establishing comprises:
    (c1) sending a first device address to the second wireless device, wherein said first device address corresponds to the first wireless device; and
    (c2) paging the first wireless device using said first device address, thereby establishing the connection.

16. The method of claim 12, further comprising (d) assigning a server role to the first wireless device and a client role to the second wireless device, and if the connection is lost, re-establishing the connection using said client role and said server role.

17. The method of claim 16, wherein said re-establishing comprises paging the first wireless device, wherein said paging is repeated a first number of attempts until the connection is re-established, and if the connection is not re-established, returning to operation (a).

18. A wireless device that communicates via a wireless link, said wireless device comprising
    means for performing inquiries at random intervals;
    means for performing inquiry scans and page scans when not performing said inquiries;
    means for performing said page scans while performing said inquiry scans; and
    means for paging a responding device to establish the wireless link upon receiving a first device address in response to one of said inquiries, wherein said first device address identifies said responding device.

19. The wireless device of claim 18, further comprising:
    means for providing a second device address upon receiving a discovering device inquiry during one of said inquiry scans, wherein said second device address identifies the wireless device; and means for establishing the wireless link upon receiving a page to said second device address.

20. The wireless device of claim 18, wherein said inquiries have a fixed duration.

21. The wireless device of claim 18, further comprising a memory, wherein configuration information is stored in said memory upon establishing the wireless link.

* * * * *

UNITED STATES PATENT AND TRADEMARK OFFICE
CERTIFICATE OF CORRECTION

PATENT NO. : 7,215,923 B2
APPLICATION NO. : 09/924306
DATED : May 8, 2007
INVENTOR(S) : Jason Hillyard Page 1 of 1

It is certified that error appears in the above-identified patent and that said Letters Patent is hereby corrected as shown below:

Column 12, line 17 delete "comprising;" and insert --comprising:--.
Column 12, line 18 delete "perfonning" and insert --performing--.
Column 12, line 55 delete "comprising" and insert --comprising:--.

Signed and Sealed this

Sixth Day of November, 2007

JON W. DUDAS
*Director of the United States Patent and Trademark Office*